(12) United States Patent
Selitser (10) Patent No.: US 6,686,558 B2
(45) Date of Patent: Feb. 3, 2004

(54) ATMOSPHERIC PRESSURE INDUCTIVE PLASMA APPARATUS

(75) Inventor: Simon I. Selitser, Fremont, CA (US)

(73) Assignee: TimeDomain CVD, Inc., Fremont, CA (US)

( * ) Notice: Subject to any disclaimer, the term of this patent is extended or adjusted under 35 U.S.C. 154(b) by 124 days.

(21) Appl. No.: 09/768,979

(22) Filed: Jan. 23, 2001

(65) Prior Publication Data

US 2001/0008229 A1 Jul. 19, 2001

Related U.S. Application Data

(62) Division of application No. 09/356,066, filed on Jul. 19, 1999, now Pat. No. 6,218,640.
(60) Provisional application No. 60/093,439, filed on Jul. 20, 1998.

(51) Int. Cl.[7] .............................................. B23K 10/00
(52) U.S. Cl. ............................ 219/121.52; 219/121.48; 219/121.59; 156/345; 438/681; 315/111.51
(58) Field of Search ..................... 219/121.52, 121.48, 219/121.36, 121.43, 121.4; 438/681; 156/345; 216/68; 315/111.51

(56) References Cited

U.S. PATENT DOCUMENTS

| | | | | |
|---|---|---|---|---|
| 4,795,880 A | * | 1/1989 | Hayes et al. | 219/121.52 |
| 5,083,004 A | * | 1/1992 | Wells et al. | 219/121.5 |
| 5,648,701 A | * | 7/1997 | Hooke et al. | 315/111.21 |
| 5,683,548 A | * | 11/1997 | Hartig et al. | 427/569 |
| 5,704,976 A | * | 1/1998 | Snail | 117/98 |
| 5,811,022 A | * | 9/1998 | Savas et al. | 216/68 |
| 5,903,106 A | * | 5/1999 | Young et al. | 315/111.51 |
| 6,117,772 A | * | 9/2000 | Murzin et al. | 438/681 |
| 6,264,742 B1 | * | 7/2001 | Vekris et al. | 117/204 |
| 6,300,245 B1 | * | 10/2001 | Murfzin et al. | 438/681 |

* cited by examiner

Primary Examiner—Mark Paschall
(74) Attorney, Agent, or Firm—George M. Steres (57) ABSTRACT

An inductive plasma torch operating at atmospheric pressure is used for wafer or glass substrate processing. Said torch employs a linear type of plasma confinement. This linear torch is particularly suitable for photoresist etching and processes in which it has the advantages of high chemical isotropic etch rate and low plasma damage.

9 Claims, 6 Drawing Sheets

ATMOSPHERIC PRESSURE INDUCTIVE PLASMA APPARATUS

CROSS REFERENCE TO RELATED APPLICATIONS

This is a division of application Ser. No. 09/356,066 filed Jul. 19, 1999 now U.S. Pat. No. 6,218,640.

This patent application is related to, and claims priority from, U.S. provisional patent application Ser. No. 60/093,439 filed Jul. 20, 1998, which is hereby incorporated by reference.

FIELD OF THE INVENTION

This invention relates in general to methods and apparatus for wafer and glass substrate processing and relates more particularly to a wafer and glass substrate processing plasma system in which the plasma is generated by an atmospheric pressure inductively coupled plasma torch.

BACKGROUND OF THE INVENTION

Plasma etching and particularly photoresist plasma etching (sometimes called photoresist stripping or ashing) in the fabrication of circuits is attractive because it can be chemically selective over different type of layers used in wafer and glass substrate fabrication. Dry (plasma) etch is also more attractive than wet etch, since important environmental issues are associated with the operation of wet chemical processing equipment. The high DI water and wet chemical consumption rate of wet etch approaches represent a large direct chemical and utilities cost. In addition, disposal of resultant large volumes of highly corrosive liquid chemical waste is both costly and hazardous.

A significant opportunity for further expansion in the use of Dry (Plasma) Etch and particularly Photoresist Etching exists in Flat Panel Display (FPD) manufacturing. Etching of the photoresist in FPD manufacturing has historically relied on wet chemical processes. The inherent limitations of wet etch are often exacerbated by unique challenges of wet processing for large-area FPD substrates, which have reached 550×650 mm dimensions in the newest manufacturing lines. Since the size of Flat Panel Display substrates is usually significantly larger than that encountered in wafer manufacturing, both the cost and hazard of wet etch in FPD manufacturing are substantially bigger and demand for substitution of wet etch with dry etch techniques is very high. Such substitutions are progressing slowly because of the absence of reliable and inexpensive large area plasma sources.

Plasma Discharge Regimes

We must distinguish two regimes of plasma discharge: low- and high-pressure discharges.

Low-pressure Discharge

The light and heavy charged particles in low-pressure discharges are almost never in thermal equilibrium, either between themselves or with their surroundings. Because these discharges are electrically driven and are weakly ionized, the applied power preferentially heats the mobile electrons, while the heavy ions efficiently exchange energy by collisions with the background gas. Hence, electron temperature ($T_e$) is much greater than ion temperature ($T_i$) for these plasmas. The pressure of these discharges is low and in the range of: $p \approx 1$ mTorr–10 Torr. Low pressure discharges are characterized by electron temperature $T_e \approx 1$–10 eV, $T_i << T_e$, and ion densities $n_i \approx 10^8$–$10^{13}$ cm$^{-3}$ (see, for example, M. A. Lieberman and A. J. Lichtenberg, *"Principles of Plasma Discharges and Materials Processing"* John Willey&Sons, 1994). The ion temperature, $T_i$, usually does not exceed a few times room temperature, e.g. $T_i \approx 0.026$ eV. In low-pressure discharges feedstock gases are broken into positive ions and chemically reactive etchants, which then flow to and physically and/or chemically react at the substrate surface. While energy is delivered to the substrate also, e.g. in the form of bombarding ions, the energy flux is there to promote the chemistry at the substrate, and not to heat the substrate. Since the heavy particles in a low-pressure plasma are relatively cold, heat flux to the wafer is small and heat management in this case is not an issue (as long as the wafer is remote from the plasma and has negligible voltage near substrate, i.e. bias). Although electron density may be three to five orders of magnitude lower than gas density, the electrons play central roles in sustaining the discharge and in processing at low pressure. Because $T_e >> T_i$, it is electrons that dissociate the feedstock gases to create the free radicals, etchant atoms, and deposition precursors, required for the chemistry at the substrate. Electrons also ionize the gas to create the positive ions that subsequently bombard the substrate.

A plasma consists of two qualitatively different regions: a quasineutral ($n_i \approx n_e$), equipotential conductive plasma body and boundary layer, called the plasma sheath. The plasma body consists of substantially equal densities of negative and positive charged particles as well as radicals and neutral particles. The plasma sheath is an electron deficient, poorly conductive region in which the gradient in the space potential (self-bias) is large. The plasma sheath forms between the plasma and any surrounded surface such as the substrate and walls of plasma chamber. This plasma sheath is useful for anisotropic etch processing. Anisotropic etch enables the production of IC features having sidewalls that are perpendicular to the plane of the photoresist layer. To enhance such anisotropy in modern ULSI (Ultra Large Scale Integration) technology additional power (usually RF) is applied to the substrate (RF bias). The existence of self-bias and the dc component of RF bias leads to substantial kinetic energy in the ions bombarding the substrate. For these ions, bombarding energy can be as high as ten times the electron temperature and a hundred times the $T_e$ for RF bias, even though the ion temperature is two orders of magnitude lower than the electron temperature. Unfortunately, for many IC structures (e.g. thin gate dielectric, etc.) such energy is highly damaging and has become a significant problem in modern ULSI technology. For many isotropic etch processes such high energy bombardment is not required or recommended. The most important such process is photoresist etching. In this process plasma is used for dissociation of oxygen molecules; the products of dissociation, oxygen atoms, are used for ashing organic photoresist. In many other etch processes (so called soft or non-critical etch) neutral free radicals are used for etching and ion bombardment only increase the etch rate, in part by increasing the temperature of the substrate. In such cases high sheath potential and high ion bombardment energy (which result from high electron temperature) are damaging for IC processing. To avoid this damage in modern systems, such as those used for photoresist stripping, specially designed grids are inserted between the plasma source and the wafer. These grids are intended to stop plasma from flowing down to the wafer, but allow free radicals to go through and chemically etch photoresist. Despite these precautions, charge build-up still occurs on the wafer, and the use of a grid significantly reduces ash rate (by about 50%) and contributes to the degradation of system performance over time. The requirement for low damage photoresist stripping shifted oxygen ashers from diode-type to downstream plasma ashers. The technologies currently available include downstream microwave, RF diodes and inductive sources, and even dual mode microwave and RF downstream oxygen plasma ashers.

Problem associated with low pressure plasma photoresist removal include: 1) post-etch "sidewall polymers" that are formed during the reactive plasma etch (RIE); 2)post-etch "via veils"; 3) polysilicon "sidewall stringers"; 4) metal etch residues, and 5) ion implant residues. Without going into the details of formation of these residues, we will note that the usual approach to dealing with the first three residues is to add a short step (about 15s) in the end of the ashing process which involves Oxygen/Fluorine ashing (F<2%). Metal etch residues can be decreased or, in some cases, removed by adding a small amount of halogens.

High dose ion implants create a hardened crust on top of the photoresist mask that is not only difficult to remove in a low pressure plasma discharge, but effective at blocking the escape of vapors from the underlying resist. Using standard low pressure plasma strip techniques to remove the crust will heat up these vapors and cause miniature explosions, often called "poppers". One approach to dealing with this hardened crust is to use a longer, lower temperature ashing process, which removes the crust, followed by a standard resist removal step and final clean-up.

High-pressure Discharge

High-pressure discharges are also used for processing. These discharges have electron temperature $T_e \approx 0.1$–$1$ eV and density $n_i \approx 10^{14}$–$10^{19}$ cm$^{-3}$, and the light and heavy particles are more nearly in the thermal equilibrium, with $T_e \approx T_i$. For those reasons such plasmas are often called thermal plasmas. These discharges are used mainly to heat the substrate, to melt, sinter, or evaporate materials, or to weld or cut refractory materials. Operating pressures are typically near atmospheric pressure (760 Torr). Distinct difference between low- and high-pressure discharges can be seen from the FIG. 1, where electron and gas temperature as function of pressure are shown for an arc discharge.

Figure 1:
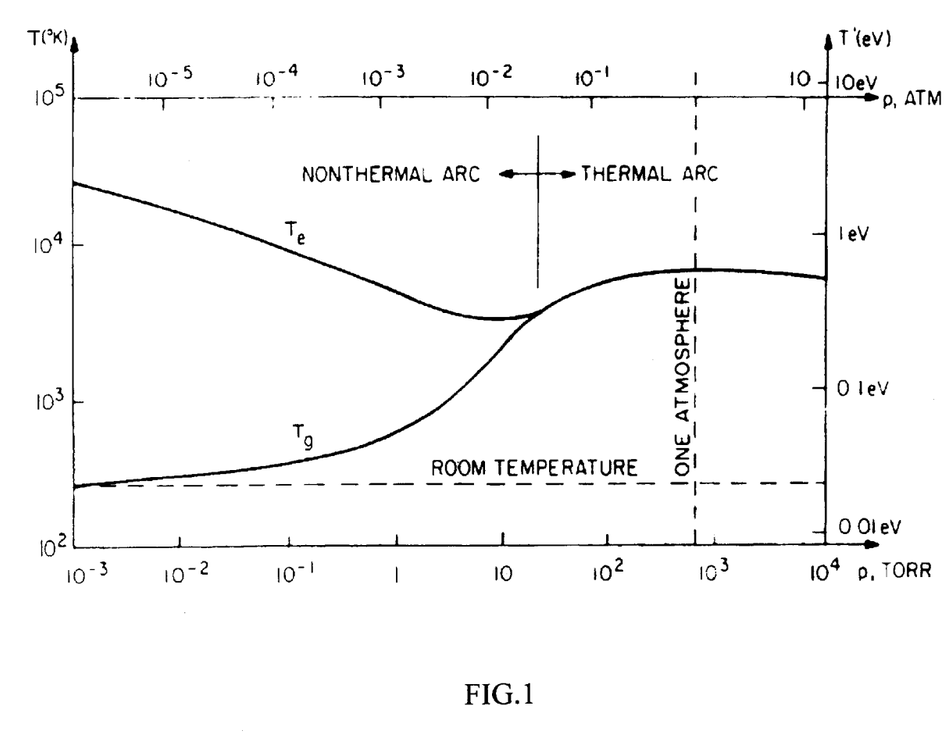
FIG. 1 illustrates the difference between thermal and non-thermal arcs (see, for example, J Reece Roth, "*Industrial Plasma Engineering*" v. 1, *Institute of Physics Publishing*, 1995).

As we can see from the FIG. 1, an atmospheric pressure plasma has a temperature in the range of 4000° K. to 10000° K., which greatly exceeds any allowed temperature for semiconductor circuits. Careful thermal management is required to employ these plasmas in device processing. This was a reason why atmospheric pressure plasma has not heretofore found a role in ULSI processing.

Atmospheric (thermal) plasma has been mainly produced by DC (sometimes RF) electrical arc discharge or by an Inductively Coupled Plasma Torch. A problem of using an arc discharge in device manufacturing, in addition to the thermal management issues noted above, is erosion of the arc's electrodes which leads to contamination of devices. High pressure arcs cannot be sustained without copious emission of electrons from the cathodes, and this is accomplished by two mechanisms: thermionic emission and field emission. The cathode spots are one or more points of plasma attachment of high current density (on the order of 500–1000 A/cm$^2$) where the cathode material is very hot (typically in the range from 2000 to 3000° C.). The cathode spots usually move over the cathode surface with a velocity of the order of a meter per second. The anode spot is a single "hot spot", and the anode gets higher heat loads than the cathode. These higher total heat loads can lead to anode burnout. To prevent erosion of electrodes a high heat transfer rate (on the order of 5 kW/cm$^2$) must be established. Since the requirements on metal contamination in IC processing are very severe, high pressure arcs have not been used, up to now, in front-side IC processing.

Inductive Plasma Torches have been extensively used in spectrochemical analysis as an emission source and in manufacturing of optical fiber and fused silica.

A commercial system with atmospheric pressure arc plasma generation has been developed at the Moscow Institute of Electronic Engineering for backside etching and surface cleaning (see, for example, G. Pavlov et al, *Appl. Physics A*, v.63, p.9, 1996). A similar system was later commercialized by IPEC Precision (see, for example, O. Siniaguine, *Proc. of 1st Plasma Process-Induced Damage Symposium*, p. 151, 1996). A plasma arc funnel is produced in this system by applying DC power to two water cooled metal electrodes. The plasma-forming gas is argon and it is injected through both electrodes. The reactants (fluorine and chlorine containing gasses, oxygen, etc.) are injected between electrodes. The argon and reactants create a thermal plasma jet which may be used for backside etching. Since the plasma jet is much smaller than the wafer size, backside etching is produced by multiple consecutive wafer passes over the jet. To control wafer temperature and etch uniformity, the wafer is precisely moved by a computer-controlled drive. The problems associated with such systems are: 1) electrode erosion and wafer contamination (as we discussed above), 2) the small local area of plasma etching requires precise overlap of consecutive passes to have a reasonable etch uniformity, limiting extendibility of this approach to new processes or different substrate sizes. Cylindrical inductive torches are well known in the art, but have not been applied to semiconductor processing heretofore. For small substrates a conventional cylindrical torch may be employed by appropriate motion of the substrate relative to the torch. For larger substrates, the time of processing will become excessively long using g a small diameter cylindrical torch. Simple scaling of cylindrical torches to large areas (for example, 200 mm diameter) would require excessive RF power for excitation, since the power scales as roughly the square of the diameter.

Accordingly, it is desirable to provide an improved plasma generation and processing system.

SUMMARY OF THE INVENTION

Accordingly, the method and apparatus of the present invention are intended to provide a new technology and new type of Etch System which operates at atmospheric pressure using an electrodeless inductive plasma torch. The Linear Plasma Torch (which is described below) or conventional cylindrical Plasma Torch, is used to dissociate, ionize, and heat a plasma gas or gasses. RF power is inductively coupled to an atmospheric pressure (thermal) plasma to provide energy for ionization and dissociation of the gas or gasses. A wafer or glass substrate is moved past the plasma flow from the torch. Wafer (or glass substrate) speed, distance from the torch to the wafer (or glass substrate), and number of passes over the plasma flow are determined by the required etch rate and temperature of the wafer or glass substrate. The reactive gas can be diluted to decrease etch rate if desired. This system is extremely efficient in plasma processing, particularly in photoresist etching. This method also provides the ability to control independently the etch rate and the temperature of substrate.

Another embodiment of the present invention provides a linear type of plasma torch. We define herein a Linear Inductive Plasma Torch (LIPT) as a torch which has a length substantially bigger than its width. This type of torch has advantages over the cylindrical type of plasma torch since it could provide a plasma for processing wafers and glass substrates without substantial increases in power and gas flow, and substantially simplifies wafer or glass substrate processing. If the length of the Linear Inductive Plasma Torch is bigger then the wafer diameter or the width of glass substrate, only linear movement of the substrate relative to the torch is required for processing. Combining this with atmospheric operation of the torch, high etch rate, and very low plasma electron temperature, this system provides a substantially simpler, faster and less damaging method of processing compared with conventional methods.

Accordingly, the present invention provides A plasma generating apparatus characterized in that the plasma generating apparatus generates an inductively coupled, thermal plasma for use in the processing of the surface of a semiconductor device.

In another aspect, the present invention provides a plasma generating apparatus having a linear inductive thermal plasma torch including one or more tubes having a width and a length; and a coil surrounding said one or more tubes for generating a plasma from one or more gases that pass through said one or more tubes, wherein the length of said one or more tubes is substantially greater than the width.

In yet another aspect, the present invention provides a method of processing a semiconductor device with a plasma, comprising the steps of:

providing one or more inductive thermal plasma torches, each including one or more tubes, and a coil surrounding said one or more tubes;

generating a plasma from one or more gases that pass through said one or more tubes, said plasma extending from a top surface of said plasma torches; and contacting the semiconductor device in close proximity to the plasma torch with the substrate moving laterally relative to the torch, such that the plasma processes the surface of said semiconductor device.

DETAILED DESCRIPTION OF A PREFERRED EMBODIMENT

Figure 2:
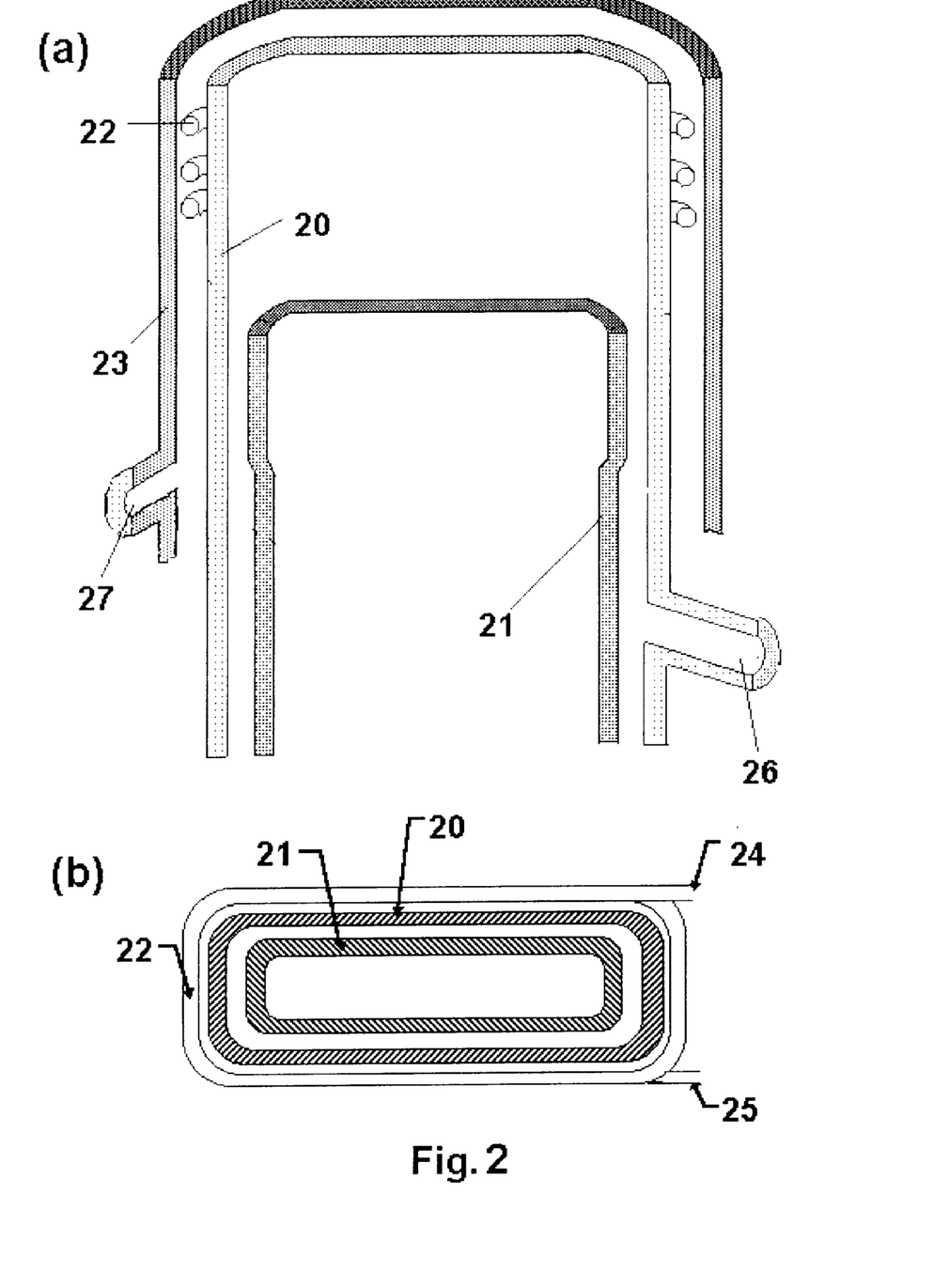
FIG. 2a is a cross-sectional side view of a Linear Inductive Plasma Torch.
FIG. 2b is a top view of a Linear Inductive Plasma Torch (outside tube not shown).

In FIG. 2, we schematically depict a Linear Inductive Plasma Torch. It consists of three nested quartz tubes 20, 21, and 23, which have a rectangular cross-section, with a small gap between them. The intermediate tube 20 (plasma confinement tube) is surrounded by a water cooled RF-driven induction coil 22 (two or more turns). This coil ignites and sustains the plasma. Since the temperature of the plasma is very high, cooling (sheath) gas is injected between the inside 21 and plasma confined 20 tubes. The inside tube extends up to the level of the first turn of the induction coil 22. It essentially serves to achieve a flow pattern in the torch with a relatively high velocity sheath gas (5–50 l/m) flowing close to the inside wall of the plasma confinement tube 20 in order to reduce heat losses and protect it from overheating. The sheath gas can be injected with both swirl and axial velocity components through the side injection port 26. A swirl component provides for better cooling and reduced mixing with the central (plasma) gas. Mixing between central and sheath gas is much reduced in the presence of the plasma. Additional cooling gas (5–80 l/m) is injected between the plasma confinement 20 and outside 23 tubes. This gas provides additional cooling for the intermediate tube. It could also be injected with a swirl component through side injection port 27 and could be allowed to flow in the plasma processing region above the torch or confined and diverted from this area.

The central (plasma) gas is chosen to be applicable for plasma processing. The application of an oscillating magnetic field (generated by AC current in the coil) results in the generation of induced current in the cylindrical outer shell of the plasma. The thickness of the shell, known as the skin depth, $\delta$, is a function of the frequency, $\omega$, and the average electrical (dc) conductivity of the plasma, $\sigma$,:

$$\delta = \left(\frac{2}{\omega\mu_0\sigma}\right)^{\frac{1}{2}}$$

where $\mu_0$ is permeability of free space. RF power at 13.56 MHz is predominantly utilized in plasma generation because this frequency is an ISM (Industry, Scientific, Medical) standard frequency. Other ISM frequencies are at 27.12 and 40.68 MHz, which are first and second order harmonics of the 13.56 MHz ISM standard frequency. The skin depth would be about 4–6 mm at 13.56 MHz for an oxygen plasma. The optimum coupling efficiency is obtained for $R_p/\delta$ between 2 and 3, when $R_p/R_c$ is between 0.9 and 0.75 [see for example, A. E. Mensing et al, *NASA, CR*-1312, 1969], where $R_p$ and $R_c$ are radii of the plasma and coil respectively. The inner diameter of the plasma confinement tube must thus be between 15 mm and 35 mm for the best coupling at 13.56 MHz.

The length of the tube is determined by the size of the wafer or glass substrate. For 200 mm wafers, the torch should be more than 200 mm in lateral extent, allowing some margin past the edges of the wafer. For a 300 mm wafer diameter the length of the torch would be more than 300 mm. For a three-turn coil with a distance between turns of about 15 mm and assuming minimum width of the tube as 15 mm, the plasma generation volume for a 220 mm tube is about 100 cm$^3$. An atmospheric pressure inductive plasma usually can be run at 50–70 W/cm$^3$, which would require 5–7 kW total power. For a 320 mm tube we would similarly require 8–10 kW of total power. We have estimated above some optimum conditions for LIPT operation. Certainly, the LIPT could have a wider or narrower plasma confinement tube and smaller or larger length, and they could operate at higher or lower power. But we should mention that operating at higher power density does not necessarily mean more energy coupling to the plasma (in fact, usually the reverse). Compiled data for Inductive Plasma Torches (see, for example, A. V. Donskoi, V. M. Goldfarb, V. S. Klubnikin, "*Physics and Technology of low-temperature plasma*" (Russian), 1972) shows that changes in dissipated power from 70 W/cm$^3$ to 1500 W/cm$^3$ cause the maximum temperature to change as little as from 8400 K. to 10,070 K. At low power density maximum temperature inside of the torch can be as low as 6000° K., which is more then sufficient for dissociation of many gasses and particularly oxygen, but sustaining the plasma at very low power density could be a problem. Molecular oxygen becomes 99% dissociated to atomic oxygen at 5000° K. (see, for example, J. Bacri et al, *Plasma Sources Sci. Tech.*, v.6, p.114, 1994). An oxygen plasma is predominantly atomic oxygen gas in the temperature range of 5000 K.–7000 K., with a degree of ionization below $10^{-5}$ and electron-ion energy around 0.5 eV. These conditions are considerably different from those pertaining to a low pressure plasma, where average electron temperature is four to six times higher (2–3 eV), which translates into a four to six times higher "sheath" voltage (and wafer charging) at low pressure. Plasma-to-surface ion bombardment energy is usually five to six times the electron temperature, that is, 12–15 eV for a low pressure plasma compared with 2–3 eV for an atmospheric pressure plasma. If the plasma is allowed to cool down to 3000–4000° K. (~0.3 eV), the degree of ionization will drop below $10^{-7}$, but atomic oxygen concentration will remain between 20% and 80% (see, for example, , J. Bacri et al, *Plasma Sources Sci. Tech.*, v.6, p.114, 1994). Indeed, at this temperature atomic oxygen ions (O$^-$) with concentration around $10^{-7}$ will exceed the electron concentration of below $10^{-8}$, resulting in near-complete disappearance of the "sheath". Even at 20% atomic oxygen, the flux of oxygen atoms (~nv/4~p/√T) at atmospheric pressure is 50 times higher than at low pressure (at 1 Torr, assuming 100% dissociation at low pressure, which is not actually true).

Figure 3:
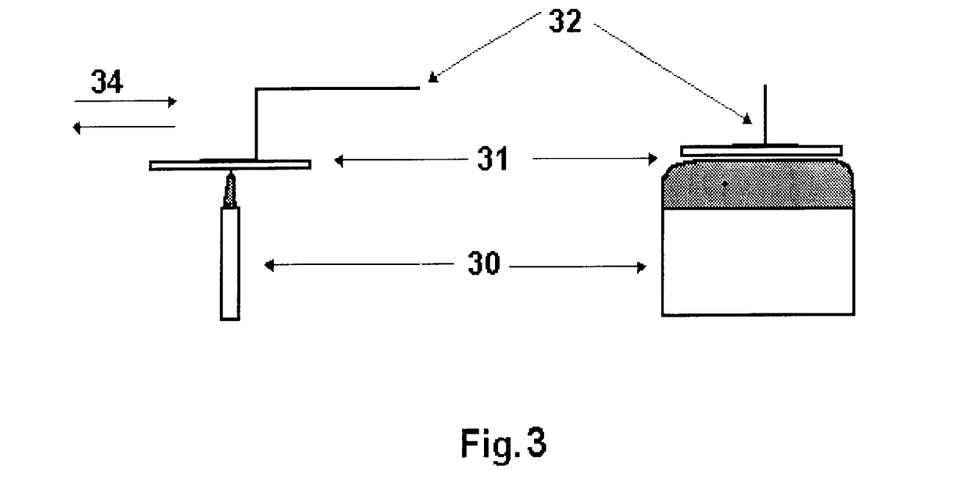
FIG. 3 illustrates the concept of using a Linear Inductive Plasma Torch for processing.

As we have seen from the discussion above, an atmospheric pressure plasma has a temperature which greatly exceeds any allowed temperature for semiconductor circuits. Careful thermal management is required to employ these plasmas in device processing. Fortunately, at atmospheric pressure the flux of radicals to the etched surface is much higher (hundreds of times) than at low pressure (1–10 Torr). As we have seen above for an oxygen plasma, even in the case when atomic oxygen is only 20% of the total composition, the total flux of atomic oxygen remains very high. Since the temperature of the atmospheric gas is also high, the decomposition of any materials which enter the gas phase should be nearly instantaneous (for example the activation energy of photoresist ashing is about ~0.2–0.4 eV). We can estimate the etch rate of photoresist in an atmospheric oxygen plasma to be 50–100 times higher than in conventional ashers: 250–500 $\mu$m/min is not unreasonable. At such rates, a 3 $\mu$m layer of photoresist could be completely removed from a 200 mm wafer within 1–5 seconds by scanning the wafer in an atomic oxygen flow from the LIPT. In FIG. 3, which illustrates processing with the LIPT, a wafer (or other substrate) 31 is scanned (moved) by handle 32 through the gas flow from the LIPT 30. If the LIPT is designed with its length bigger than the wafer diameter or substrate width (as illustrated on the right hand side of FIG. 3) only linear relative motion 34 of the wafer (or substrate) and LIPT is required. We can estimate a wafer (or substrate) speed in the range of 0.01–1 m/s. At such speeds the temperature of the wafer could be easily controlled bellow 200–500° C. By varying the distance between the plasma torch and the wafer (or other substrate), diluting the precursor (active plasma gas) with an inert gas, and changing wafer (or other substrate) speed and the number of passes, the wafer (or other substrate) temperature and etch rate can be optimized independently. Since the etch rate in atmospheric plasmas is so high, such variations should have little effect on the throughput of the system.

The inventor has found that the following conditions are effective for the removal of photoresist from silicon substrates, using a conventional cylindrical torch with 25 mm diameter sheath flow about 15 slpm, central (plasma gas) flow about 1–2 slpm, power 600–1000 Wafts at 27 Mhz, with the substrates positioned about 1 to 5 cm about the upper edge of the inductive coil, and moving laterally over the torch at from about 2 to 18 cm/second. these conditions have been found to remove photoresist at 30 to 60 microns/minute in the region where the plasma gas encounters the substrate, using a gas mixture containing up to 8% oxygen in argon. The inventor believes that even higher local rates can be obtained using higher oxygen concentrations. The removal rate is nearly insensitive to the height of the substrate within the cited range. For a substrate velocity of 5 cm/second the substrate reaches a temperature of roughly 100 degrees centigrade during processing. Excessively slow velocities (less then 2 cm/second) can lead to more heating and even to mechanical failure of the substrate.

Figure 4:
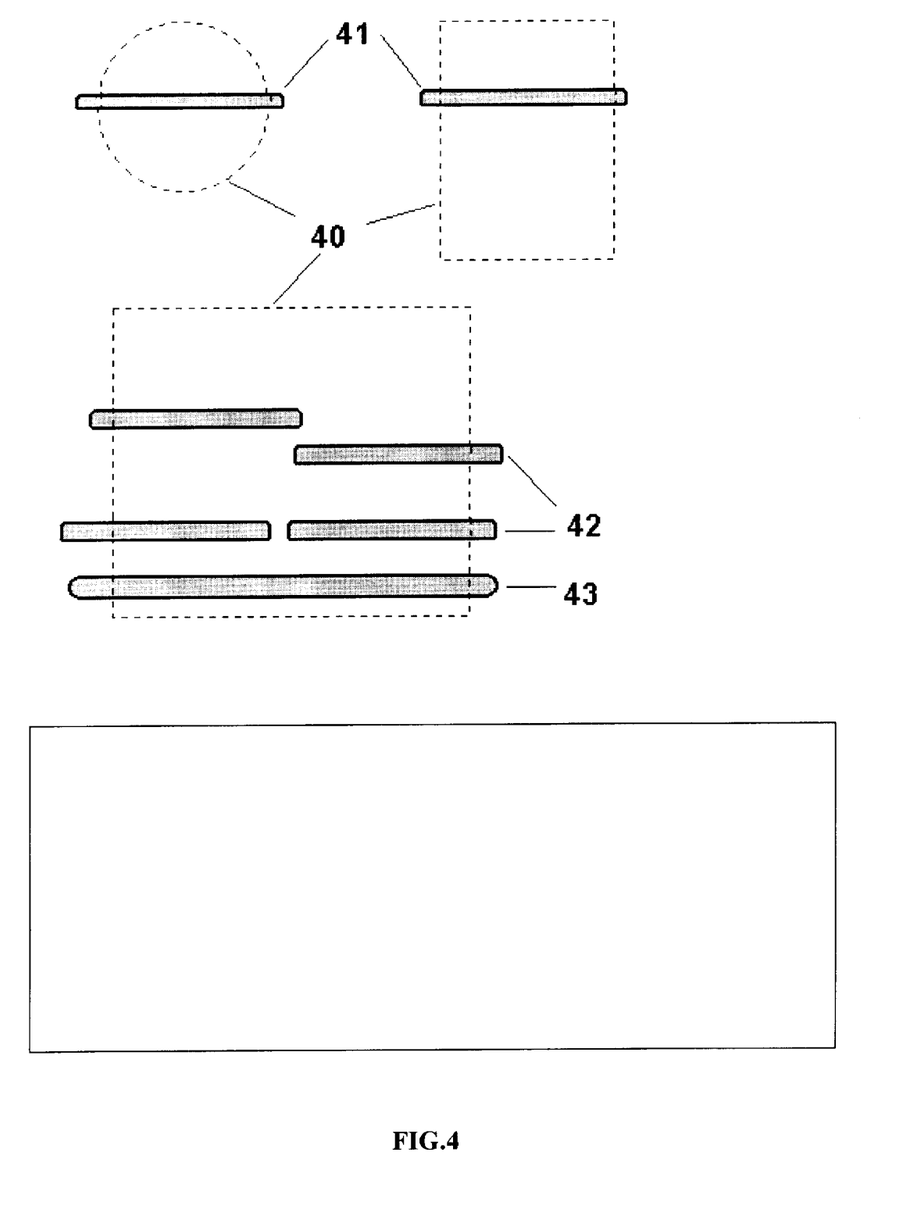
FIG. 4 illustrates a different arrangement of a Linear Inductive Plasma Torch and wafer or glass substrate in processing.

FIG. 4 illustrates how different types and sizes of substrate 40 and LIPT, 41 and 43, can be arranged relative to each other for fast and easy processing. Such arrangements should provide the best results in term of uniformity. In the case where using a very long LIPT is not convenient or not practical (i.e. a very wide substrate), at least two LIPTs can be arranged in parallel, 42 or 44. Such an arrangement should be done in a way that gives the best uniformity for etch rate on the substrate. In the case where higher rate is desired LIPT 43 (or 42, 44) can be also used in series 45.

Figure 5:
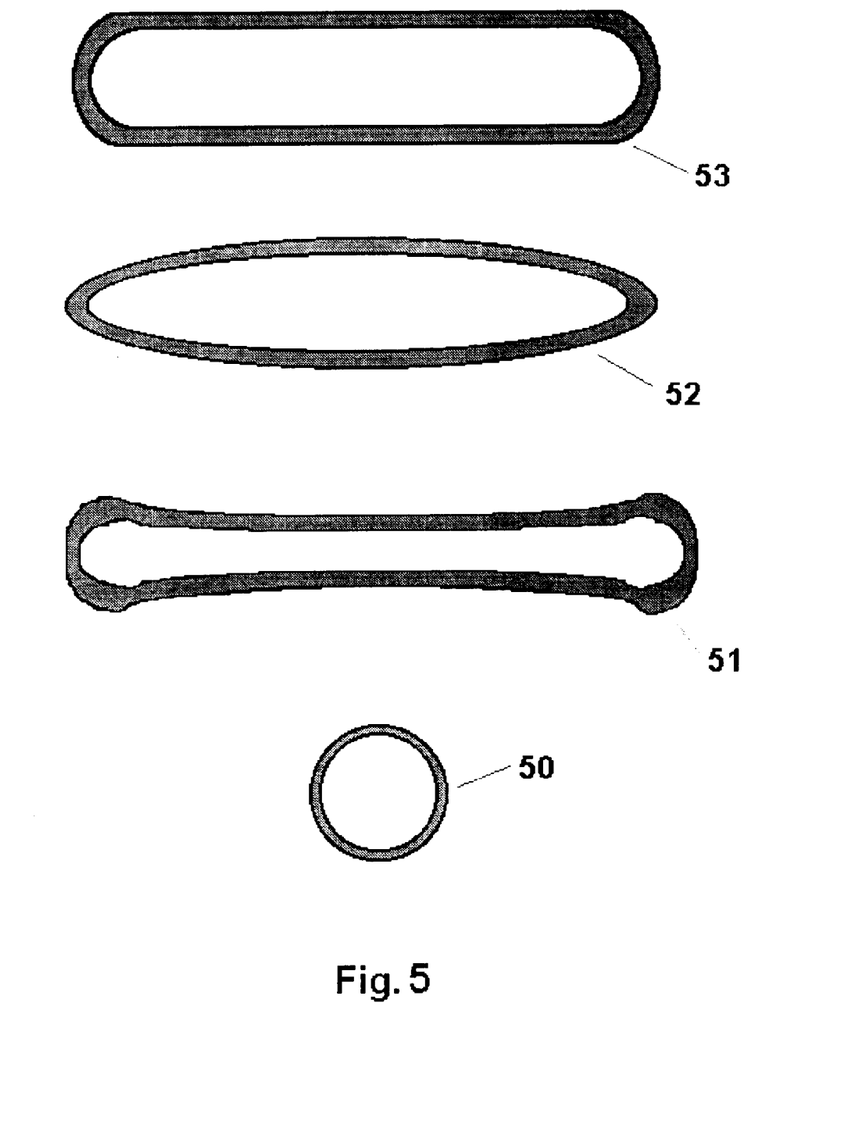
FIG. 5 is a cross-sectional top view of different shapes of plasma confinement tubes in Linear Inductive Plasma Torch.

FIG. 5 illustrates a different shape of plasma confinement tube for the LIPT. A standard inductive plasma torch has a cylindrical confinement tube 50 which can be used for processing if local, very high etch rate is desired. A Linear Inductive Plasma Torch can be uniform 53, or have thinner center, 51, compared with the edges. Such a shape could be used to offset a slower gas flow at the edges, which could lead to slower etch rate at the edges. If, for some reasons, a uniform LIPT 53 produced a faster etch rate at the edges, a LIPT 52 with thicker center could be used to offset such problem. In addition to the above mention shapes of the LIPT, other profiles can be used also if different etch profiles are required or some unusual etch profiles from a uniform LIPT 53 need to be offset.

Figure 6:
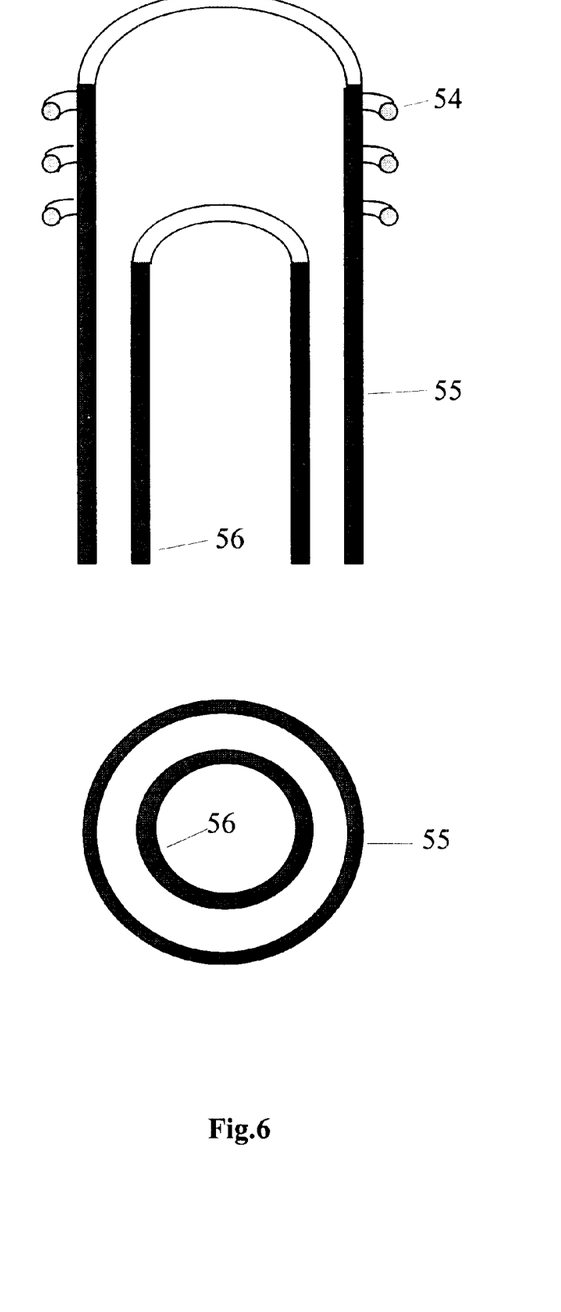
FIG. 6 is a cross-sectional view of a cylindrical plasma torch which may be used with the present invention.

Of particular advantage, the method of the present invention may be employed with a conventional Inductive Plasma Torch as illustrated in FIG. 6. The conventional cylindrical Inductive Plasma Torch, consists generally of two nested quartz tubes 55 and is 56 surrounded by an induction coil 54. The induction coil is connected to an RF generator and sustains a plasma in the region near the coil. Gas flow between the inner and outer tubes provides cooling for the quartz tube in the plasma region. We should note that, while the arrangement shown in FIG. 6 is the most common and flexible design, many alternatives including a single tube with inductive coil are possible.

What is claimed is:
1. An apparatus comprising:
 an inductively coupled plasma generator arranged to generate a plasma in quasi-thermal or thermal equilibrium, said generator further having an opening configured to direct said plasma extending in an axial direction, said generator formed to shape said extending plasma with a transverse cross-section characterized by a length and width perpendicular to said axial direction, wherein said length is greater than said width.

2. The plasma generating apparatus of claim 1 wherein said inductively coupled plasma generator is comprised of:

a linear inductive thermal plasma torch including one or more tubes having a transverse width and a transverse length for directing said plasma in said axial direction from one or more gases that pass through said one or more tubes;

a coil surrounding said one or more tubes for generating said plasma from said one or more gases that pass through said one or more tubes, wherein said transverse length of said one or more tubes is substantially greater than said transverse width.

3. The plasma generating apparatus of claim 1 wherein said linear inductive torch is comprised of one or more gas conducting tubes configured to define a front surface arranged to direct said shaped plasma toward a work surface spaced at a uniform distance from said front surface; and a mechanism movably supporting said work surface for relative lateral motion perpendicular to said axial direction at said uniform spacing across said axial directed plasma;

wherein said mechanism is adapted to expose the entire work surface area to said shaped plasma in one or more lateral scans.

4. The plasma generating apparatus of claim 1 wherein said apparatus operates at approximately atmospheric pressure.

5. The plasma generating apparatus of claim 1 wherein said thermal plasma is an oxygen-containing plasma and is used to remove photoresist on the surface of said semiconductor device.

6. The plasma generating apparatus of claim 1 wherein said thermal plasma is used to etch the surface of said semiconductor device.

7. A plasma generating apparatus, comprising:

a linear inductive thermal plasma torch including one or more gas conducting tubes having a transverse width and transverse length; and a coil surrounding said one or more gas conducting tubes for generating a plasma from one or more gases that pass through said one or more tubes, wherein said length of at least one of said tubes is substantially greater than the width.

8. The plasma generating apparatus of claim 7 wherein said plasma torch is used for processing semiconductor substrates and the length is substantially the same size as the substrate.

9. The plasma generating apparatus of claim 7 wherein said one or more tubes is comprised of at least two nested tubes, and said nested tubes promote sheath flow around the plasma.

\* \* \* \* \*